United States Patent
Martinez-Bustos et al.

(10) Patent No.: US 6,387,437 B1
(45) Date of Patent: May 14, 2002

(54) HIGH PRESSURE PROCESS AND SYSTEM FOR THE PRODUCTION OF FRESH WHOLE CORN MASA, NIXTAMALIZED WHOLE CORN FLOUR, AND DERIVED PRODUCTS

(75) Inventors: Fernando Martinez-Bustos, Veracruz; Jose De La Luz Martinez-Montes, Puebla; Feliciano Sanchez-Sinencio, Estado de México; Maximiano Ruiz-Torres, Michoacan, all of (MX)

(73) Assignee: Instituto Politecnico Nacional, Zacatenco (MX)

( * ) Notice: Subject to any disclaimer, the term of this patent is extended or adjusted under 35 U.S.C. 154(b) by 0 days.

(21) Appl. No.: 09/537,012

(22) Filed: Mar. 28, 2000

(51) Int. Cl.7 .............................. A23L 1/212; A23B 9/02
(52) U.S. Cl. ........................ 426/622; 426/507; 426/508; 426/509; 426/618
(58) Field of Search ................................. 426/618, 622, 426/507, 508, 509

(56) References Cited

U.S. PATENT DOCUMENTS

| | | | |
|---|---|---|---|
| 2,584,893 A | 2/1952 | Lloyd et al. | 99/93 |
| 2,704,257 A | 3/1955 | Diez De Sollano et al. | 99/93 |
| 3,194,664 A | 7/1965 | Eytinge | 99/80 |
| 3,404,986 A | 10/1968 | Wimmer et al. | 99/93 |
| 3,730,732 A | 5/1973 | Rubio | 99/80 |
| 4,189,504 A | * 2/1980 | Jimenez | 426/508 |
| 4,513,018 A | 4/1985 | Rubio | 426/622 |
| 4,594,260 A | 6/1986 | Vaqueiro et al. | 426/622 |

FOREIGN PATENT DOCUMENTS

MX          125285      4/1972

OTHER PUBLICATIONS

Montemayor, E., and Rubio, M., (1983) "Alkaline Cooked Corn Flour. Technology and Uses in Tortilla and Snack Products", (Abstract), Cereal Foods World, 28:577.

Molina, et al., "Drum Drying for the Improved Production of Instant Tortilla Flour", J. Food Science, 42:1432–1434.

Gomez et al., "Dry Corn Masa Flours for Tortilla and Snack Foods", Cereal Foods World, 32:372–377.

* cited by examiner

Primary Examiner—Helen Pratt
(74) Attorney, Agent, or Firm—Abelman, Frayne & Schwab

(57) ABSTRACT

A high pressure process and system for the production of fresh whole corn masa, nixtamalized whole corn flour, and derivates wherein dry corn grains are transported by means of an elevator to a series of cleaning screens to separate impurities and foreign material before they are subjected to a cooking step. The corn grains as well as lime and water are fed continuously to a cooking device, which is subjected under a combination of pressure and temperature, to reduce the time of cooking of the whole corn grains. So, nixtamalized corn grains are obtained for the preparation of fresh whole corn masa and nixtamalized whole corn flour for tortillas, tortilla chips or the like.

7 Claims, 1 Drawing Sheet

HIGH PRESSURE PROCESS AND SYSTEM FOR THE PRODUCTION OF FRESH WHOLE CORN MASA, NIXTAMALIZED WHOLE CORN FLOUR, AND DERIVED PRODUCTS

BACKGROUND OF THE INVENTION

Corn has been the traditional cereal for the preparation of tortillas in Mexico and some countries of Central America. Also, corn tortillas, corn chips, and tortilla chips have widely penetrated the market of the United States and some countries of Asia and Europe. In Mexico, approximately 70% of the total corn production is consumed in the form of tortillas. For low resource population, tortillas are the main source of calories and proteins.

The traditional method to process corn into tortillas (nixtamalization) goes back to early Mesoamerican civilizations, and the basic steps of the process have remained basically unaltered since. The traditional process, whole corn is cooked in a boiling water-lime (or water-ash) solution for a short time (5–45 min) and steeped in this solution, as it cooks, for a period from 12 to 18 hours. The cooking liquor, called nejayote, is discarded; with it is lost the fraction of the pericarp and germ dissolved in the nejayote. The cooked, steeped, and drained corn grains (nixtamal) are washed to remove excess lime; here again, a part of pericarp and germ material is lost . The total corn fraction lost varies from 7 to 15%. The nixtamal is ground with a pestle and stone into masa. Finally, the masa is flattened into thin disks that are cooked on a hot griddle for 30–60 seconds on each side to produce tortillas. Tortillas prepared by the traditional method just described generally show excellent Theological characteristics, such as puffing and elastic strength.

On the other hand, some of the main problems associated with the method of the previous art are:

1. Part of the pericarp and germ is discarded, loosing important amounts of thiamin, riboflavin, fat, fiber, protein, and other components of the corn grain;
2. It includes the discharge of polluting effluents (called nejayote), as the cost of treating nejayote before discarding it is too high to be done under the current scheme;
3. It is not suitable for instant flour production;
4. It involves long steeping times, with the attendant hygiene problems; and,
5. It uses subjective criteria to control the different stages of the process, resulting in a final product of varying quality.

Masa for tortilla can also be obtained by hydrating instant flour, which in turn is made from drying fresh masa. Although the quality of tortilla made from instant flour is inferior to that made from fresh masa, the industrial production of nixtamalized corn flour has become popular among the small and large tortilla producers because of its advantages insofar as distribution as storage are concerned.

Fresh masa for instant flour is manufactured by a variation of the traditional method. Smaller cooking time and temperature is used because the drying process causes additional gelatinization. The most commonly employed method is shown in U.S. Pat. No. 2,584,893, issued to W. R. Lloyd and R. Millares-Sotres, on February 1952. This patent uses pots with water, lime and corn. Water vapor is injected until boiling temperature is almost reached. The lime is kept in suspension by circulating the cooking water. To make tortillas, the mixture is kept at boiling temperature for 30 to 40 minutes; for other purposes such as snacks, this time is lower.

After cooking, cold water is added, and the corn is steeped for 1 to 6 hours. The nejayote is removed, the nixtamal is washed in rotating barrels with spraying water, and the grains are milled in a hammer mill. The resulting material is dried in a flash-type dryer and ground and sieved with a good control of the particle size distribution to obtain the required characteristics of the product.

However the disadvantages mentioned above are inherited to the current industrial method of flour production, in addition, the quality of tortillas made from instant flour is usually poorer than the quality of tortillas by the traditional method.

Prior efforts have been directed towards the improvement of the stability of the end products, the reduction of cooking time, the reduction of losses of a soluble alkali-substances, the improvement of the final product to approach that set by the traditional method.

For example, U.S. Pat. No. 2,704,257, issued to C.F.S. Diez de Sollano and J. M. Berriozabal on Mar. 15, 1955, discloses a method for producing corn tortilla flour which includes an improvement over the traditional nixtamalization process, by directly converting the wet nixtamal into a dry flour in one single milling and drying step. The traditional cooking and steeping steps, however, continue to be carried out prior to the milling and drying of the nixtamal corn grains.

U.S. Pat. No. 3,194,664, issued to Eytinge, B. D. on Jul. 13, 1965, discloses a method for the production of nixtamal, without departing from the traditional nixtamalization process continuous by providing a steeping receptacle at the top of which the corn kernels are continuously fed, and at the bottom of which an alkaline steeping solution is fed in counter-current with said kernels and at a suitable cooking temperature to accomplish the nixtamalization of the corn in a time of approximately 5 hours. Although this method represents an improvement over the traditional nixtamalization process, it requires the use of very costly equipment that is difficult to control.

U.S. Pat. No. 3,730,732, issued to Manuel Jesus Rubio, (May 1973), reports an increase in the yield of masa by incorporating water soluble alkaline substances. Also, Rubio reported that adding soluble alkaline substances to masa retards spoilage of tortillas. However, the tortillas tend to become hard and brittle.

U.S. Pat. No. 3,404,986, issued to Wimmer, et al, on Oct. 8, 1968, reported a method of manufacturing a corn flour with a rich whole corn flavor, different from flour obtained by lime treatment. These authors partially gelatinize a previously prepared corn meal with closely adjusted heated rotating rolls. The resulting flakes are thereafter ground to obtain corn flour. The instant flour obtained by this process can be used for fried snacks but not for the manufacture of tortillas.

Mexican patent No. 125,285, issued to Celorio on Apr. 25, 1972, describes a different process and apparatus for the preparation of nixtamalized corn flour by using a dry process in which a previously prepared corn meal with an appropriate amount of lime is heated in a chamber. The released moisture from the corn meal creates a humid and hot atmosphere within the nixtamalization chamber, sufficient for nixtamalization of the corn meal without the addition of an aqueous medium. This process, however, may be regarded as producing poor results in view of the fact that the admixture of the corn meal and the lime in a powdered state, leads to lack of inhomogenities in the nixtamalization process, with the consequent difficulties in quality control of the corn flour obtained by said process.

U.S. Pat. No. 4,513,018, issued to Rubio, M. J. on Apr. 23, 1985, discloses a continuous method for producing corn flour suitable for making tortillas, taco shells, tortilla chips and the like, which uses a modified nixtamalization process which includes the precooking of corn grains in the presence of lime within a vessel provided with a screw conveyor. The precooked kernels are then treated with a spray of hot water and are passed to a cooling zone where they remain for a time sufficient to reabsorb a sufficient amount of water. The steeped grains are milled and the flour is classified and re-milled until the desired particle size is obtained. In this way cooking is done continuously, which represents an improvement over the traditional nixtamalization process, although the main problem of the traditional method remains.

U.S. Pat. No. 4,594,260, issued to M. C. Vaqueiro and P. Reyes on Jun. 10, 1986, discloses a method for obtaining corn flour, in which the hull is removed from the germ and endosperm of the corn kernel. The hull is nixtamalized by the traditional method and then re-mixed with the non-nixtamalized endosperm and germ fractions. This method, although more efficient than the traditional method in view of the fact that only a small fraction of the corn kernel has to be nixtamalized, requires rather elaborate equipment to separate the hull fraction. Also the hull must be free of endosperm fractions in order to produce a good quality of masa for instant flour preparation.

Other methods of instant flour production have been proposed. Montemayor and Rubio in the paper "Alkaline cooked corn flour: Technology and uses in tortilla and snack products. (abstr.) Cereal Foods World 28:577, 1983" described continuous and discontinuous (batch) processes in which the lime, water, and corn mixture are placed in a spiral band in a vapor atmosphere, in such a way that the corn is cooked as it is transported. The corn is later washed to remove part of the pericarp and excess lime, dried, and ground.

Molina, M. R., Letona, M., and Bressani, R., 1977 (Drum drying technology for the improved production of instant tortilla flour. J. Food Sci. 42:1432–1434), reported the use of a double drum dryer with an internal pressure of 1.1–1.83 kg/cm2 (15–26 psi) and a temperature of 93–104° C. These dryers give lower losses of solids, but their energy consumption is high.

Mendoza (1975) reported a method using a vapor chamber with a temperature in the 80–120° C. range.

Sterner and Zone (1981) used the heat generated during grinding of the waterlime-corn mixture to cook the corn. Some of these processes grind the whole corn grain and the starch granules are exposed to over-gelatinization or low hydrolysis of the pericarp, resulting in a masa of poor quality.

On the other hand, some industrial producers of tortilla use fresh masa to make tortilla because the quality of the texture and flavor of tortilla made from instant corn flour is lower than that made from fresh masa, and the drying process is energetically expensive (Gomez, M. H., Rooney, L. W., Waniska, R. D. and Pflugfelder, R. L. 1987; Dry corn masa flours for tortilla and snack production; Cereal Foods World. 32:372).

Unfortunately, none of these methods provide an integral solution to the tortilla industry. They either it solve all problems to an adequate level but use a complicated and expensive process, or they retain the drawback of the traditional process. Our method is simple and inexpensive and addresses all the problems of tortilla production.

OBJECTIVES OF THE INVENTION

A main objective of the present invention is to provide a system and a process for the production of fresh whole corn masa, instant corn flour and derived products using high pressure, with out producing polluting effluents.

Another objective of the present invention is to provide a system and a process for the production of fresh whole corn masa, instant corn flour and derived products, using high pressure, which uses the whole corn grain, avoiding the loss of vitamins, minerals, protein, fat, and fiber of the germ and pericarp, that are lost during the traditional and industrial processes.

Another objective of the present invention is to provide a system and a process for the production of fresh whole corn masa, instant corn flour and derived products, using high pressure, wherein the processing time is short.

An additional objective of the present invention is to provide a system and a process for the production of fresh whole corn masa, instant corn flour and derived products, wherein pericarp hydrolysis and water absorption are achieved in a short time by high temperatures and high pressures, using a small amount of lime.

Another objective of the present invention is to provide a system and a process for the production of fresh whole corn masa, instant corn flour and derived products, wherein all the solubilized nutrients are not wasted and, in fact, contribute to improve the the rheological characteristics of tortilla produced from this masa.

An additional objective of the present invention is to provide a system and a process for the production of fresh whole corn masa, instant corn flour and derived products, wherein the whole masa can be used for the production of tortillas and corn chips or, through the stages of dehydration, milling and sieving for the production of nixtamalized whole corn instant flour.

These and other objectives and additional advantages of the present invention will become evident to the experts in the field from the following detailed description of the invention, and a specific embodiment of the same will also be described in an illustrative sense without, however, limiting this invention.

DETAILED DESCRIPTION OF THE INVENTION

Figure 1:
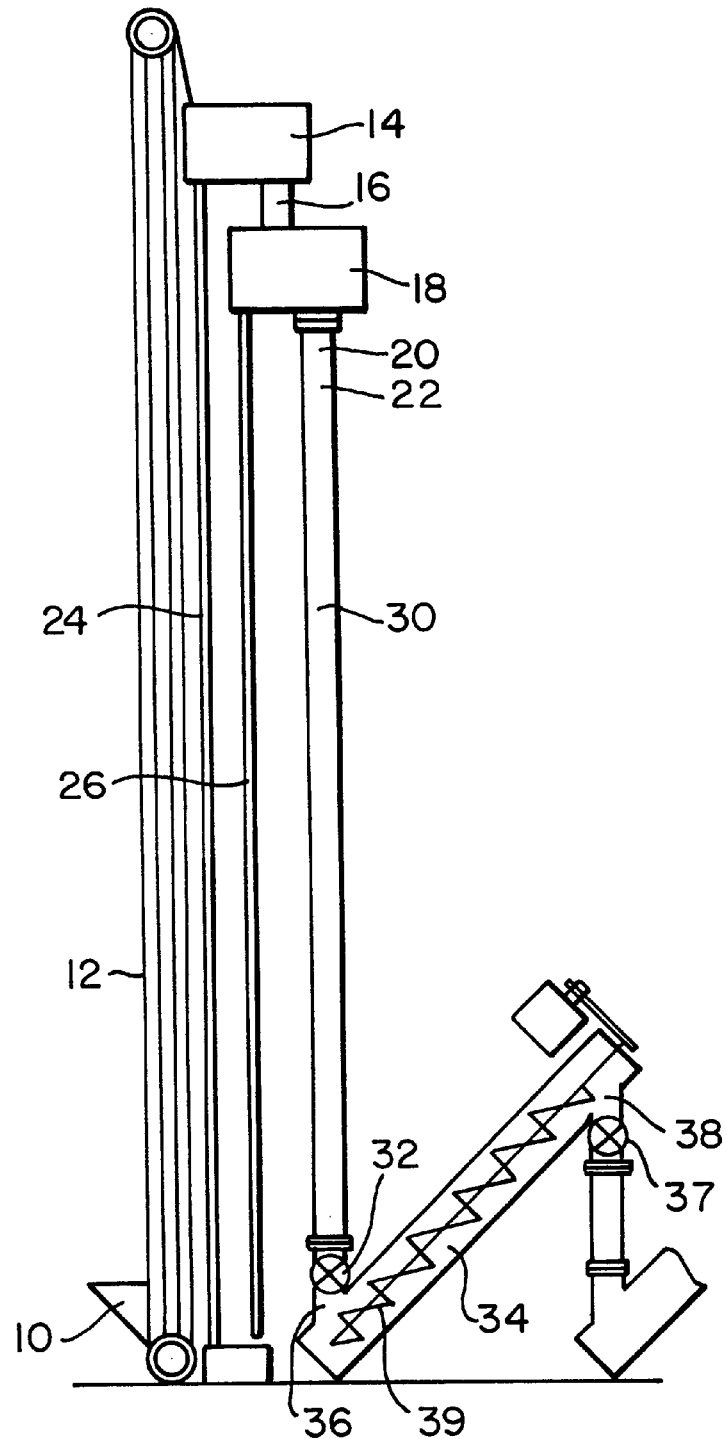
FIG. 1 shows an elevation in a schematic view of the system and of the process for the production of fresh whole corn masa, instant corn flour and derived products, using high pressure.

Now a particular reference will be made to a specific embodiment of the present invention, as is illustrated in FIG. 1 which is attached and wherein the same numbers refer to the same parts. FIG. 1 shows a system for the production of fresh whole corn masa, instant corn flour and derived products, wherein grains are transported from a hooper 10 by means of elevator 12 to a first screen 14, wherein the corn grains undergo a first cleaning step. After the first cleaning, the corn grains go through a first duct 16 which connects first screen 14 and a second screen 18. In this second screen 18, a second cleaning step of the grains is carried out. The humidity and hardness of the grains are controlled by means of a hardness sensor 20 and a humidity sensor 22 located below the second screen 18. Impurities and foreign material are discharged by means of discharge ducts 24 and 26 located respectively below first screen 14 and second screen 18. A second duct 30 connects the second screen 18, to a first feeding valve 32. A pressurizing chamber 34 for cooking the corn grains under pressure is attached to the first feeding valve 32. The pressurizing chamber 34 has an entrance 36, where the first feeding valve 32 is attached and an exit end 38. A second extraction valve 37 is attached at the exit end 38 of the pressurizing chamber 34.

In a first embodiment of the process of the present invention, the cooking of the grains takes place in the pressurizing chamber 34 under a pressure between 0.5 and 5.2 atmospheres, for a period between 0 and 20 minutes, preferably 6 to 15 minutes, with periodic stirring, and at a temperature ranging between 95° C. and 140° C. The starting material used in the process is whole corn. Water and lime are injected under pressure in the pressurizing chamber 34. The corn grains are transported through the pressurizing chamber 34 from the entrance 36 to the exit end 38 by means of a worm 39. In this manner the corn grains are continuously fed through the first feed valve 32, and cooked during their transportation within the pressurizing chamber 34 and finally, extracted from the pressurizing chamber through the second extraction valve 38. This process is carried out in a continuous form.

In another embodiment the cooking of the grains takes place in the pressurizing chamber 34 under a pressure between 20 and 25 lbs/pressure, for a period between 5 and 7 minutes with periodical stirring, and at temperatures ranging between 121° C. and 125° C. and a concentration of calcium hydroxide with water between about 3% to about 0%. Water and lime are injected under pressure in the pressurizing chamber 34. Enough water is added to surpass the corn level, so that during the cooking stage, corn is fully immersed.

Whole corn can be of any genotype. The term "integral corn" or "whole corn", refers to corn grain with all its parts, including its inherent humidity, and free of impurities and foreign material. The chamber should have a device that allows the administration of heat by any vehicle, such as direct fire, hot vapor, joule heating, infrared radiation, microwave radiation, or any other heating system. Water that was not absorbed by the grains escapes in the form of vapor. Any excess of lime sticks to the wall of the chamber and can be reused.

Once the grains are cooked in the pressurizing chamber 34, they go through a stabilizer 40. In this part of the process the hot grains—with an humidity between 20% to 50% (w/w)—are cooled from 120° C. to 35° C.

After this, the cooked grains are milled in a stone, hammer, or disc mill with characteristic pattern and pattern size. Fresh whole corn masa is obtained with a moisture content ranging from 9 to 58% (w/w).

If the objective is to obtain nixtamalized whole corn flour, then a step of drying is carried out by known means.

If the purpose is to elaborate fresh tortilla, a drying step is not required.

So, the starting materials used for the production of fresh whole corn masa, instant corn flour and derivates, using high pressure are whole corn, water, and lime. Whole corn can be of any genotype. Lime concentrations may vary from 0 to 3% (w/w) and can be substituted by any other chemical compound causing pericarp hydrolysis and hydration of the whole grain in presence of water. Water concentration can vary from 40% to 200% (w/w) and its temperature from 0° C. to 100° C.

In a first embodiment, the mixture may be steeped for some time (0–10 hours) in any vessel at atmospheric pressure.

The cooking step takes place in the pressurizing chamber 34 under a pressure between 0.5 and 5.2 atmospheres, for a period between 0 and 20 minutes with periodical stirring, and temperature ranging from 95° C. and 140° C. Any excess of lime sticks to the wall of the chamber and can be reused.

EXAMPLES

The following are some examples of the process which were carried out in a laboratory of CICATA. However, these examples are illustrative and not limiting, and are given to further describe this invention.

Example 1

This example describes a process for elaboration of nixtamalized whole corn flour for tortilla and derived products using whole corn, without additives. Clean whole corn (500 g), free of foreign material, was placed in a vessel with hot water (230 ml) and lime (1% w/w) and then cooked for 6 minutes in the pressurizing chamber heated by an electrical resistor (270° F., 26–27 psi). The cooked grain (nixtamal) with 31% moisture content (without cooking liquor) was milled in a hammer mill in order to obtain fresh masa that was dehydrated with hot air. The resulting dehydrated masa was hammer milled and sieved to yield the whole corn flour with 9% moisture content. The whole corn flour showed a water absorption index of 1.25 (100 g of flour absorbed 125 ml of water for preparation of masa). The resulting nixtamalized whole corn flour was mixed with water to prepare masa. The masa was shaped in flat discs using a manual machine and cooked on a hot griddle (290° C.±10° C.) for 25 seconds on one side, followed by 35 seconds on the opposite side, and turned to the initial side until puffing is achieved. The resulting tortillas showed excellent characteristics of color, flavor, puffing, and texture (rollability).

Example 2

This example describes a process for elaboration of fresh masa for tortilla and derivatives using whole corn, without additives. Clean whole corn (500 g), free of foreign material, was placed in a vessel with water (400 ml) and lime (1.5% w/w) and then cooked for 15 minutes in the pressurizing chamber, which was heated by an electrical resistor (250 degrees F., 15–17 psi). The cooked grain (nixtamal), with a 52% moisture content, was milled in a stone mill in order to obtain fresh masa. The preparation of tortillas from the masa was done as described in Example 1. The resulting tortillas showed excellent characteristics of color, flavor, puffing, and texture (rollability). Also the baked tortillas were formatted in small circles and triangles and fried for tortilla chips.

Example 3

This example describes a process for elaboration of fresh masa. Prior the cooking step, the whole grain was steeped for 20 minutes in water containing calcium hydroxide (0.5% w/w). The steeped grain was cooked for 8 minutes in the pressurizing chamber, which was heated by an electrical resistor (120° C., 1–1.2 Kg/cm2). The cooked grain (nixtamal) with 20% moisture content was milled, sieved, and dehydrated with hot air. Masa was prepared from the instant flour by mixing with added water. The preparation of tortillas from the masa was done as described in Example 1. The resulting tortillas showed excellent characteristics of color, flavor, puffing, and texture (rollability).

Example 4

This example describes a process for the elaboration of nixtamalized whole corn flour for tortilla and derived products using whole corn, without additives. Clean whole corn (500 g), free of foreign material, was placed in a vessel with hot water (230 ml) and lime (1% w/w) and then cooked for 6 minutes in the pressurizing chamber (120° C., 0.8 Kg/cm2). The heat was generated by applying a voltage to a couple of electrodes in such a way that a current traveled through the mixture. The cooked grain (nixtamal) with 31% moisture content (without cooking liquor) was milled in a disc mill in order to obtain fresh masa that was dehydrated with hot air. The resulting dehydrated masa was hammer milled and sieved and to yield the whole corn flour with 9% moisture content. The whole corn flour showed a water absorption index of 1.25 (100 g of flour absorbed 125 ml of water for preparation of masa). Masa was prepared from the instant flour by mixing with added water. The preparation of tortillas from the masa was done as described in Example 1. The resulting tortillas showed excellent characteristics of color, flavor, puffing, and texture (rollability).

Example 5

This example describes a process for elaboration of fresh masa for tortilla and derived products using whole corn, without additives. Clean whole corn (500 g), free of foreign material, was placed in a vessel with room water (220 w/w) and lime (1.5% w/w) and then cooked for 10 minutes in the pressurizing chamber (120° C., 0.5 kg/cm2). The heat was generated by applying a voltage to a couple of electrodes in such a way that a current traveled through the mixture. The cooked grain (nixtamal) with 50% moisture content was milled in a stone mill in order to obtain fresh masa. The preparation of tortillas from the masa was done as described in Example 1. The resulting tortillas showed excellent characteristics of color, flavor, puffing, and texture (rollability). Also, the baked tortillas were formatted in small circles and triangles and fried to produce tortilla chips.

As can be observed of the above, the products that can be elaborated from the masa obtained in this process are the following:

I. Tortilla and derivatives with the following options: with and without additives (preservatives, nutrients, hydrants, etc.), from fresh masa or from instant flour, with or without the stepping.

II. Fresh masa for the elaboration of the products described in Point I.

III. Instant flour for the elaboration of the products described in Point I.

The quality of the products is at least comparable to the quality of the products made with the current process.

As can be seen from the above our effort was directed at developing a process that minimizes the crucial steps of the traditional method, so that Theological characteristics and general quality of the traditional tortillas are retained, but such that no fraction of the corn grain is lost, no polluting effluents are generated, and no large steeping times are needed. In the traditional method, nejayote has to be discarded because of its high lime content, and lime is needed to hydrolyze the pericarp and allow the diffusion of water into the grain. In our process, pericarp hydrolysis is achieved by subjecting the grains to high pressure and temperature values. Reduction in steeping time is accomplished with same process variables, which speeds diffusion of water into the internal regions of the grain. As in the traditional process, starch granules are not damaged because, when grains are cooked, they are fully immersed in water, so water availability is not a limiting factor for starch granule swelling; in addition, granule swelling takes place inside the grain matrix, helping to protect them. The inclusion of the whole pericarp and whole germ enriches the textural quality of the final product. The hydrolysis of the pericarp releases gums, conferring appropriate texture to the masa with characteristics equal to those produced by the traditional process.

Water is added in enough quantities to appropriately hydrate the grains, so no water is wasted. The combined action of water, lime, temperature, and pressure produce a cooked grain with appropriate characteristics to be milled in stone, hammer, or disc mills or any other method known to the experts in the field. By controlling the cooking parameters (stepping time, cooking pressure, temperature and time, lime content) it is possible to obtain cooked grains suitable for the production of fresh masa or for instant flour. An important advantage of the process is that, because no effluent is discarded, the yield is from 8 to 15% higher than in the traditional and current instant flour production process. Our process is simple and energy-efficient.

However, it should be understood that the described invention should not be limited to the embodiments described above and it will be apparent to the experts in the field that other diverse embodiments can be implemented, as well as alternative embodiments, which will be clearly contained within the spirit and scope of the invention which makes the following claims.

What is claimed is:

1. A process for the production of fresh whole corn masa and derived products, wherein dry corn grains are transported by an elevator to a series of cleaning screens which separate impurities and foreign material from the grains before they are subjected to a cooking step, said process comprising the steps of:

feeding a quantity of whole corn grains, lime and water into a cooking device;

cooking the whole corn grains, water and lime in said cooking device at a pressure between 0.5 and 5.2 atmospheres; and milling the cooked grains to obtain fresh whole corn masa.

2. The process for the production of fresh whole corn masa and derived products, as claimed in claim 1, wherein the feeding and the cooking of the whole corn grains are carried out continuously.

3. The process for the production of fresh whole corn masa and derived products as claimed in claim 1, wherein the cooking step is carried out at a temperature having a range between about 95° C. and about 140° C.

4. The process for the production of fresh whole corn masa and derived products, as claimed in claim 1, wherein the cooking step further includes the step of fully immersing the corn grains in water.

5. A process for the production of nixtamalized whole corn flour and derived products wherein dry corn grains are transported by an elevator to a series of cleaning screens which separate impurities and foreign material from the grains before they are subjected to a cooking step, said process comprising the steps of:

feeding a quantity of whole corn grains, lime and water into a cooking device;

cooking the whole corn grains, water and lime in said cooking device at a pressure between 0.5 and 5.2 atmospheres;

milling the cooked corn grains by means of milling devices to obtain a fresh whole corn masa; and drying the fresh whole corn masa in a dryer to obtain nixtamalized whole corn flour.

6. The process for the production of nixtamalized whole corn flour and derived products as claimed in claim 5 wherein the cooking step is carried out at a temperature having a range between about 95° C. and about 140° C.

7. The process for the production of nixtamalized whole corn flour and derived products as claimed in claim 5, wherein the cooking step further includes the step of fully immersing the corn grains in water.

* * * * *